UNITED STATES PATENT OFFICE.

LUIGI FERRARI CORBELLI AND VINCENT RIATTI, OF FLORENCE, OF THE GRAND DUCHY OF TUSCANY, ASSIGNORS TO LUIGI FERRARI CORBELLI AFORESAID.

IMPROVEMENT IN PREPARATION OF ALUMINIUM.

Specification forming part of Letters Patent No. 21,922, dated October 26, 1858.

*To all whom it may concern:*

Be it known that we, LUIGI FERRARI CORBELLI, of Florence, in the Grand Duchy of Tuscany, commander of the Order of Malta, and VINCENT RIATTI, of the Duchy of Modena, a chemist, have invented a new or Improved Process for Obtaining Aluminium; and we do hereby declare that the following is a full and exact description of the said invention.

Our invention of a "a new or improved process for obtaining aluminium" has for its object to obtain this metal in a simple and much more economical and less costly manner than by the processes heretofore employed for the purpose. The metal is obtained direct from argillaceous earth or clay, which, after being well washed and cleansed from extraneous matters—such as stones, sticks, leaves, and such like substances—is submitted to the following process:

Take one hundred grams of the well-washed clay, and, after well drying it, digest it in about six times its weight of concentrated sulphuric acid or very strong hydrochloric acid. Then pour off the acid, wash and dry the clay again, and heat it in an earthen vessel up to 450° or 500° centigrade, after which mix with it two hundred grams of yellow prussiate of potash, which should be quite dry and pulverized. The quantity of this material that should be added to the clay will depend in some measure upon the quantity of silicious matter contained in the clay. To this mixture add one hundred and fifty grams of common salt, and place all the ingredients, when intimately mixed together, in a crucible. Heat them up to a white-heat, and after the mass is cool the aluminium will be found at the bottom of the crucible.

Having now described our invention of a new or improved process for obtaining aluminium, and having explained the manner of carrying the same into effect, we would observe that we are aware that some of the materials which we propose to employ in our improved process have been used in processes for obtaining aluminium. We do not therefore mean or intend to claim the exclusive right to use such substances; but

That which we consider to be new in the above-described process, and desire to claim as the invention to be secured to us by Letters Patent, is—

1. The combination of operations herein set forth, whereby we are enabled to reduce aluminium from earthy matters containing it as a base, or in combination with other matters.

2. The application of the prussiate of potash to the clay or earthy matters and the treatment of such clay or earthy matters with prussiate of potash in the presence of heat, substantially as above described.

In witness whereof we, the said LUIGI FERRARI CORBELLI and VINCENT RIATTI, have hereunto set our hands and seals this 3d day of April, 1858.

LUIGI FERRARI CORBELLI. [L. S.]
    V. RIATTI. [L. S.]

Witnesses:
 EMILIO MASI,
  *Of Leghorn.*
 BENEDETTO DILLACASO,
  *Of Florence.*